US009610969B2

(12) United States Patent
Oehri et al.

(10) Patent No.: US 9,610,969 B2
(45) Date of Patent: Apr. 4, 2017

(54) STEERING COLUMN FOR A MOTOR VEHICLE

(71) Applicant: THYSSENKRUPP PRESTA AKTIENGESELLSCHAFT, Eschen (LI)

(72) Inventors: Martin Oehri, Gamprin (LI); Mathias Senn, Grabs (CH)

(73) Assignee: THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 0 days.

(21) Appl. No.: 15/190,915

(22) Filed: Jun. 23, 2016

(65) Prior Publication Data
US 2016/0304114 A1 Oct. 20, 2016

Related U.S. Application Data

(63) Continuation of application No. 12/820,319, filed on Jun. 22, 2010, now Pat. No. 9,399,481, which is a
(Continued)

(30) Foreign Application Priority Data

Mar. 31, 2008 (DE) ........................ 10 2008 016 742

(51) Int. Cl.
*B62D 1/185* (2006.01)
*B62D 1/19* (2006.01)
(Continued)

(52) U.S. Cl.
CPC ............. *B62D 1/195* (2013.01); *B62D 1/184* (2013.01); *B62D 1/185* (2013.01); *B62D 1/187* (2013.01)

(58) Field of Classification Search
CPC ................................ B62D 1/184; B62D 1/195
See application file for complete search history.

(56) References Cited

U.S. PATENT DOCUMENTS

| 4,793,204 A | 12/1988 | Kubasiak |
| 4,900,178 A | 2/1990 | Haldric et al. |

(Continued)

FOREIGN PATENT DOCUMENTS

| AT | WO 2007048153 A2 * 5/2007 ............. B62D 1/184 |
| DE | 39 14 608 10/1990 |

(Continued)

OTHER PUBLICATIONS

International Search Report issued Mar. 5, 2009 in International (PCT) Application No. PCT/EP2008/009794.
(Continued)

*Primary Examiner* — James English
(74) *Attorney, Agent, or Firm* — Wenderoth, Lind & Ponack, L.L.P.

(57) ABSTRACT

A steering column for a motor vehicle includes a support unit connectable with the chassis of the motor vehicle, a securement part disposed between the side jaws of the support unit, a setting unit disposed between the side jaws of the support unit; a counter-securement part connected with the setting unit; and a clamping mechanism. The clamping mechanism is operably engaged with the setting unit such that in the opened state of the clamping mechanism the setting unit is displaceable with respect to the support unit at least in a longitudinal direction of the steering column, and in the closed state of the clamping mechanism the setting unit is secured at a set position with respect to the support unit. In the event of a motor vehicle crash, the counter-securement part is shiftable with respect to the setting unit with the consumption of energy.

15 Claims, 9 Drawing Sheets

Related U.S. Application Data continuation of application No. PCT/EP2008/009794, filed on Nov. 20, 2008.

(51) Int. Cl.
  *B62D 1/184* (2006.01)
  *B62D 1/187* (2006.01)

(56) References Cited

U.S. PATENT DOCUMENTS

| | | | |
|---|---|---|---|
| 4,989,898 | A | 2/1991 | Yamaguchi et al. |
| 5,029,489 | A | 7/1991 | Burmeister et al. |
| 5,524,927 | A * | 6/1996 | Toussaint ............... B62D 1/195 280/775 |
| 5,547,221 | A | 8/1996 | Tomaru et al. |
| 5,562,307 | A | 10/1996 | Connor |
| 5,580,091 | A | 12/1996 | Doty |
| 5,606,892 | A | 3/1997 | Hedderly |
| 6,139,057 | A | 10/2000 | Olgren et al. |
| 6,276,719 | B1 | 8/2001 | Gartner |
| 6,378,903 | B1 | 4/2002 | Yabutsuka et al. |
| 6,394,241 | B1 * | 5/2002 | Desjardins ................ F16F 7/12 188/371 |
| 6,592,148 | B2 | 7/2003 | Byers et al. |
| 7,422,239 | B2 | 9/2008 | Ishibashi et al. |
| 7,685,903 | B2 | 3/2010 | Streng et al. |
| 7,703,804 | B2 | 4/2010 | Cymbal et al. |
| 7,721,620 | B2 | 5/2010 | Matsui et al. |
| 7,866,699 | B2 | 1/2011 | Levin et al. |
| 7,891,268 | B2 | 2/2011 | Park |
| 7,896,395 | B2 | 3/2011 | Cymbal et al. |
| 8,056,436 | B2 | 11/2011 | Marable et al. |
| 8,065,931 | B1 | 11/2011 | Marable et al. |
| 8,408,089 | B2 | 4/2013 | Oshita et al. |
| 8,500,168 | B2 | 8/2013 | Goulay et al. |
| 8,783,717 | B2 | 7/2014 | Tinnin et al. |
| 2001/0019205 | A1 | 9/2001 | Ikeda et al. |
| 2002/0020999 | A1 | 2/2002 | Duval et al. |
| 2003/0000330 | A1 | 1/2003 | Murakami et al. |
| 2004/0232685 | A1 | 11/2004 | Gatti et al. |
| 2006/0090586 | A1 | 5/2006 | Lee |
| 2006/0181070 | A1 | 8/2006 | Imamura et al. |
| 2006/0243089 | A1 | 11/2006 | Cymbal et al. |
| 2006/0290128 | A1 | 12/2006 | Ridgway et al. |
| 2007/0013182 | A1 | 1/2007 | Bechtel et al. |
| 2007/0137377 | A1 | 6/2007 | Kamei |
| 2007/0170711 | A1 | 7/2007 | Bechtel et al. |
| 2007/0194563 | A1 | 8/2007 | Menjak et al. |
| 2007/0252372 | A1 * | 11/2007 | Spano .................... B62D 1/184 280/775 |
| 2008/0191457 | A1 * | 8/2008 | Ridgway ................ B62D 1/184 280/775 |
| 2008/0229867 | A1 * | 9/2008 | Waibel ................... B62D 1/195 74/493 |
| 2008/0257097 | A1 | 10/2008 | Graf |
| 2008/0284150 | A1 | 11/2008 | Yamada |
| 2010/0018340 | A1 | 1/2010 | Schnitzer et al. |
| 2010/0031768 | A1 | 2/2010 | Oshita et al. |
| 2010/0275721 | A1 | 11/2010 | Davies et al. |
| 2010/0300237 | A1 | 12/2010 | Ridgway et al. |
| 2010/0300238 | A1 | 12/2010 | Ridgway et al. |
| 2011/0041642 | A1 | 2/2011 | Havlicek |
| 2011/0115206 | A1 | 5/2011 | Sulser et al. |
| 2011/0174028 | A1 | 7/2011 | Bahr et al. |
| 2011/0210537 | A1 | 9/2011 | Uesaka |
| 2012/0024101 | A1 | 2/2012 | Schnitzer et al. |
| 2012/0125139 | A1 | 5/2012 | Tinnin et al. |
| 2012/0266716 | A1 | 10/2012 | Sulser et al. |
| 2013/0074641 | A1 | 3/2013 | Schnitzer et al. |
| 2013/0118292 | A1 | 5/2013 | Sulser et al. |

FOREIGN PATENT DOCUMENTS

| | | |
|---|---|---|
| DE | 10 2004 051 060 | 1/2006 |
| DE | 10 2005 052 123 | 1/2007 |
| DE | 10 2007 003 091 | 8/2008 |
| DE | 10 2008 007 094 | 9/2009 |
| DE | 10 2008 007 093 | 11/2009 |
| EP | 0 179 690 | 4/1986 |
| EP | 0 641 705 | 3/1995 |
| EP | 0 537 454 | 11/1995 |
| EP | 0 802 104 | 10/1997 |
| EP | 1 464 560 | 10/2004 |
| EP | 1 955 921 | 8/2008 |
| EP | 1 975 036 | 10/2008 |
| FR | 2 781 748 | 7/1998 |
| FR | 2 840 869 | 12/2003 |
| FR | 2 881 707 | 8/2006 |
| FR | 2 932 143 | 6/2008 |
| GB | 1 296 527 | 11/1972 |
| GB | 1 584 984 | 2/1981 |
| GB | 2 291 840 | 2/1996 |
| GB | 2 311 839 | 10/1997 |
| GB | 2 454 345 | 5/2009 |
| JP | 62-161081 | 10/1987 |
| JP | 7-117685 | 5/1995 |
| JP | 9-2294 | 1/1997 |
| JP | 2004-67012 | 3/2004 |
| JP | 2006-96120 | 4/2006 |
| WO | 2006/042604 | 4/2006 |
| WO | 2007/048153 | 5/2007 |
| WO | 2008/071306 | 6/2008 |
| WO | 2009/147325 | 12/2009 |
| WO | 2015/036077 | 3/2015 |

OTHER PUBLICATIONS

Notification of the first Office Action, in the English language, issued Apr. 10, 2013 in Japanese Patent Application No. 2011-501108.

Decision of Rejection dated Oct. 1, 2013 in corresponding Japanese Application No. 2011-501108, with English translation.

* cited by examiner

STEERING COLUMN FOR A MOTOR VEHICLE

This application is a continuation of application Ser. No. 12/820,319, filed Jun. 22, 2010, which is a continuation application of International application PCT/EP2008/009794, filed Nov. 20, 2008, the entire disclosure of which is incorporated herein by reference.

BACKGROUND OF THE INVENTION a) Field of the Invention

The invention relates to a steering column for a motor vehicle, which is adjustable at least in its longitudinal direction, comprising a support unit connectable with the chassis of the motor vehicle, a setting unit disposed between the side jaws of the support unit, and a clamping mechanism. In the opened state of the clamping mechanism, the setting unit is displaceable with respect to the support unit at least in the longitudinal direction of the steering column and, in the closed state of the clamping mechanism, the set position of the setting unit with respect to the support unit is secured in position. The clamping mechanism comprises a clamp bolt which penetrates openings in the side jaws of the support unit, and during the opening and closing of the clamping mechanism is rotated about its axis. At least one securement part is provided between the side jaws of the support unit and displaced through the rotation of the clamp bolt during the opening and closing of the clamping mechanism, which in the closed state of the clamping mechanism engages into a counter-securement part connected with the setting unit, or at least during the dislocation beginning in the event of a motor vehicle crash of the setting unit with respect to the support unit comes into engagement with the counter-securement part and which, in the opened state of the clamping mechanism, is spaced apart from the counter-securement part.

b) Description of Related Prior Art

Adjustable steering columns serve to adjust the position of the steering wheel to the seating position of the driver and are known in various embodiments. Apart from adjustable steering columns which are only adjustable in length or height and inclination direction, respectively, steering columns are known which are adjustable in length as well as also height and inclination direction, respectively. Such adjustable steering column is, for example, disclosed in EP 0 802 104 A1. In the opened state of the clamping mechanism, a setting unit, pivotably supporting the steering spindle, is, with respect to a chassis-stationary support unit, displaceable in the direction of a length adjustment as well as also in the direction of a height or inclination adjustment of the steering column. To increase the holding forces in the closed state of the clamping mechanism, the clamping mechanism comprises intersecting (lamella) disk packs cooperating in the manner of a lamella coupling.

Several arrangements have already been proposed for adjustable steering columns to provide, in the event of a crash of the motor vehicle, an additional holding force against a dislocation of the setting unit with respect to the support unit in order to prevent the unchecked displacement of the steering column whereby, under control through an energy absorption device of the steering column, energy absorption is also made possible. Such an energy absorption device is configured such that, for example, the support unit is realized in the manner of a carriage which is shiftably supported on a chassis unit rigidly disposed on the motor vehicle chassis, wherein between the chassis unit and the support unit an energy absorption device, for example a flexural strip, is formed.

Such an implementation is disclosed in WO2006042604. An adjustable steering column is introduced here, in which for the energy consumption during the dislocation of the holding part which pivotably supports the steering spindle, with respect to the support panel secured on the motor vehicle, a flexural plate bent in the shape of a U is provided which, in the event of a crash, effects the energy absorption by bending and through the additional tearing-open along notchings provided for this purpose. In order for the energy absorption to take place, in fact, via these notchings, it is, however, necessary to ensure that the adjustable steering column does not become dislocated within the scope of the possible adjustment range. For this purpose, the securement device with which the desired position is arrested after an adjustment must be appropriately laid out. According to WO2006042604, an additional crash blocking device is provided for this purpose. A clamping wedge is provided which, in the event of a crash, is slid into a gap between the setting unit and the support unit. The clamping wedge is connected with the clamp bolt or with a part jointly moved axially together. During the closing of the clamping mechanism, this is axially shifted together with the clamp bolt such that a contact face of the clamping wedge comes into contact on a contact face of the setting unit in order for the clamping wedge in the event of a crash during the onsetting dislocation of the setting unit to be entrained by the latter.

DE 10 2005 052 123 B3 further discloses an energy absorption device for the absorption of energy in the event of a crash, in which an arrest element disposed on the setting unit with which, in the closed state of the securement device serving for the securement of the set position of the steering column, a counter-arrest element is in engagement is so connected that in the event of a crash it is shiftable with the absorption of energy in the longitudinal direction of the steering column with respect to the setting unit. A further arrest element of a securement device shiftable with respect to the setting unit with the absorption of energy is disclosed in EP 1 464 560 A2.

U.S. Pat. No. 6,139,057 A discloses an adjustable steering column of the type described in the introduction. On the clamp bolt is disposed a securement part which, through the rotation of the clamp bolt, is turned during the opening and closing of the clamping mechanism, wherein a spring-elastic element acts between the clamp bolt and the securement part. In the closed state of the clamping mechanism, a toothing of the securement part engages into a toothing of a counter-securement part which is formed by a frame welded onto the inside of a side jaw of the setting unit. In the opened state of the clamping mechanism the toothing of the securement part is raised off the toothing of the counter-securement part. Through this arrangement, an additional holding force is applied against a longitudinal displacement of the steering column in the event of a motor vehicle crash. An arrangement is provided acting analogously in the event of a crash against the displacement of the height or inclination setting. Through the arrangement disclosed in this publication the requisite installation space of the steering column is enlarged and the tooth widths of the cooperating toothings can only be implemented such that they are relatively small whereby the additional holding force of the crash blocking arrangement is limited.

US 2006/009 0586 A1 discloses a similarly acting crash holding arrangement which acts only against a displacement of the steering column in the height or inclination direction.

BRIEF SUMMARY OF THE INVENTION

The present invention addresses the problem of providing a steering column of the type described in the introduction, which, at an implementation with relatively low installation space, in the event of a crash makes possible the reliable engagement of the securement part into the counter-securement part. This is attained according to the invention thereby that the counter-securement part is disposed on a wall parallel to the axis of the clamp bolt of the setting unit, or is formed by it.

Because the counter-securement part is disposed on a wall, located parallel to the axis of the clamp bolt, in particular of the upper or lower side wall of the setting unit or is formed by it, at a space-saving realization of the steering column. Nevertheless, a relatively large engagement width between the securement part and the counter-securement part can be realized. During the opening and closing of the clamping mechanism which, in the closed state, counteracts a displacement of the setting unit with respect to the support unit, the clamp bolt is turned about its axis and with it the securement part disposed preferably on or at the clamp bolt. In the opened state, the securement part is spaced apart from the counter-securement part, thus is brought out of engagement. In the closed state of the clamping mechanism, the securement part is, preferably resiliently, brought into contact with the counter-securement part.

In a preferred embodiment, the securement part engages into the counter-securement part after the closing of the clamping mechanism either directly under form closure or the securement part is initially only under frictional closure in contact with the counter-securement part. In the latter case through the resilient contact the securement part at a beginning dislocation of the setting unit with respect to the support unit, as can occur for example when the holding force of the clamping mechanism is exceeded, for example in the event of a motor vehicle crash, is, however, brought into engagement with the counter-securement part under form closure. The maximal value of the possible dislocation until reaching the form-closure engagement can be defined. For this purpose into the counter-securement part can advantageously be worked several engagement elements, in the simplest case cutouts, into which a form element, for example a nose, of the securement part can engage. The interspace of the cutouts defines the maximal possible shifting path up to the form-closure engagement between securement and counter-securement part.

It is herein of advantage that a multiplicity of feasibilities known within prior art can be applied for the formation of the clamping and gripping mechanism or of the clamping mechanism, with which the support unit is locked with respect to the setting unit. The locking can take place via a form closure, for example via a toothing, as well as also via a frictional closure. The activation of the clamping mechanism can also occur via the known combination of wedge disk and cam part or also via rolling bodies, which roll along predetermined tracks and which permit the appropriate tightening of the clamping system. Decisive is that a clamp bolt is provided which is oriented transversely to the shifting direction of the setting unit with respect to the support unit and, upon a change from the position in which the shifting of the support unit is made possible with respect to the setting unit, into the position in which the shifting of the support unit with respect to the setting unit is blocked, executes a rotational movement about its own axis. This rotational movement is utilized for displacing the securement part into the ready position or out of the ready position.

An advantageous embodiment of the invention provides that, in the event of a crash, the counter-securement part is shiftable with respect to the setting unit with the consumption of energy. There is thus a connection, shiftable with the absorption of energy, of the counter-securement part with the setting unit. The force counteracting the shifting is herein much larger, preferably more than one order of magnitude larger, than the conventional force required for the longitudinal displacement of the setting unit with respect to the support unit in the opened state of the clamping mechanism. If, in the event of a crash, the holding force of the clamping mechanisms is overcome and onto the counter-securement part a force acts which exceeds that counteracting the shifting of the counter-securement part, the counter-securement part can be shifted with respect to the setting unit with the consumption of energy. The counter-securement part and the setting unit are consequently separate parts in this embodiment.

The connection of the counter-securement part with the setting unit shiftable with the consumption of energy is preferably so laid out that the forces counteracting a shifting of the setting unit with respect to the chassis-stationary support unit or the vehicle chassis are in the range of 500 N to 10,000 N. Through these forces potentially further provided holding forces—in particular acting under frictional closure—of the clamping mechanism are also overcome. If the forces are within this order of magnitude, the risk of injury to the driver is minimized. Special predetermined or settable force courses over the shifting path are herein desired for optimization, which, in the ideal case, can even be settable during the crash.

In an advantageous embodiment, the counter-securement part is, for example, realized as a U-shaped bent sheet metal element with two shanks. After installment, the position of the sheet metal element is oriented such that the arc-form section of the sheet metal element is disposed in the direction toward the driver or toward the steering wheel-side end of the steering spindle. A first shank, also denoted as plate, is realized as a sheet metal strip and comprises several engagement elements. A second shank is connected with the setting unit, which directly or indirectly pivotably bearing-supports the steering spindle and includes two weakening lines, for example notchings, parallel to one another and to the other shank, between which a tear plate is formed. In case the clamping system is closed and a shifting of the setting unit takes place with respect to the support unit, through the form closure between an engagement element and the form closure element the plate is shifted such that the bow section is also shifted and the tear plate is torn out of the second shank. Through the multiplicity of engagement elements, the force-path course and the entire path available for the energy consumption are always identical independently of the displacement position of the setting unit with respect to the support unit. Instead of a tear plate, a pure flexural plate or a combination thereof could also be provided.

This preferred embodiment entails a number of advantages. For example, additional installation space is hardly required. In particular, the clamp bolt does not need to be extended and the steering column does not need to be built wider. The engagement into the clamping system is also minimal and the mounting is simple. With the aid of this embodiment, two functions are combined. In the prior art, for example in WO2006042604 A1, between the setting unit and the support unit a carriage is provided. For ease of adjustment of the steering column the setting unit is displaced with respect to the carriage. For the energy absorption under control in the event of a crash the carriage is shifted with respect to the support unit via interspaced energy absorption means. It must herein be ensured that during the energy absorption no unchecked shifting of the setting unit with respect to the carriage takes place. In the embodiment of the invention both functions are combined in one element, the U-shaped bent sheet metal element. A carriage, at least for purely longitudinally adjustable steering columns, is furthermore not required.

A steering column according to the invention can be only longitudinally adjustable or, additionally, also in height or inclination for the longitudinal adjustability. The clamp bolt can, for example, for this purpose penetrate elongated holes in the side walls of the support unit, which extend in the direction of the height or inclination adjustment. It is also conceivable and feasible that an intermediate unit is provided which is adjustable with respect to the support unit in the direction of height or inclination adjustment, wherein the setting unit is displaceable with respect to the intermediate unit in the longitudinal direction of the steering column or steering spindle. Such designs are known. In another embodiment the intermediate unit can be omitted and the side jaws of the support unit in the closed state of the clamping mechanism can be directly clamped together with the setting unit, as is also already known.

In a feasible embodiment, the support unit is rigidly secured on the chassis of the motor vehicle. In another embodiment the support unit is held on a chassis unit which, in turn, is rigidly securable on the chassis of the motor vehicle, wherein it is nonshiftable in normal operation with respect to the chassis unit. In the event of a crash (=when a threshold value of the acting force is exceeded) it is shiftable with respect to the chassis unit in the direction toward the front of the motor vehicle. Advantageously energy-consuming means, for example at least one flexural strip, can herein be provided between the support unit and the chassis unit. Such designs are known.

BRIEF DESCRIPTION OF THE DRAWINGS

Further advantages and details of the invention will be described in the following in conjunction with the enclosed drawing, in which.

DESCRIPTION OF PREFERRED EMBODIMENTS

Figure 1:
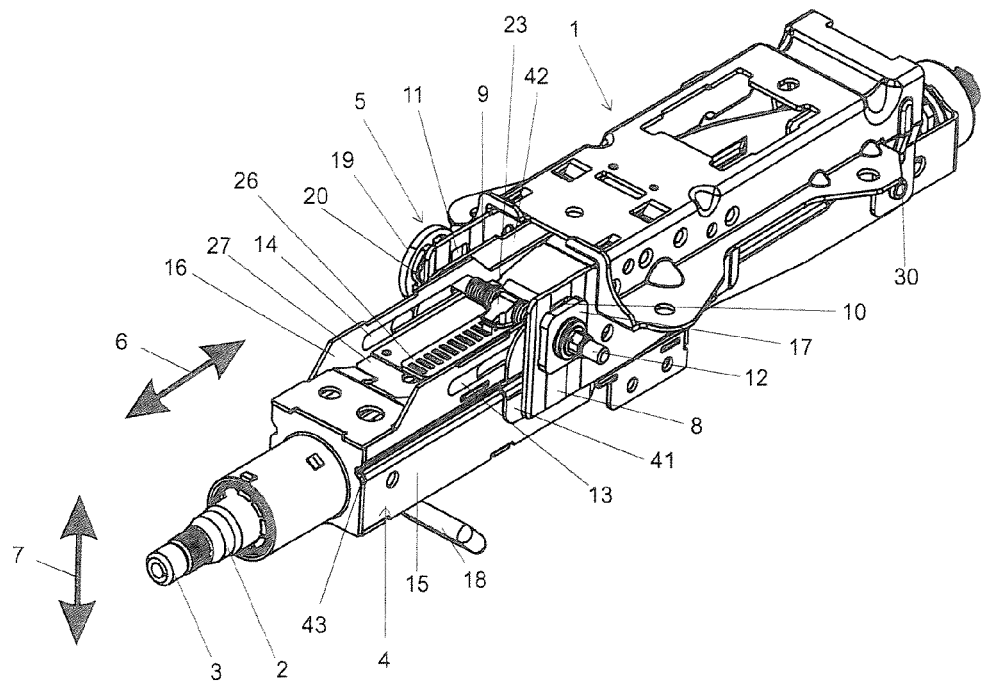
FIG. 1 is a first embodiment of a steering column according to the invention in oblique view.
Figure 7:
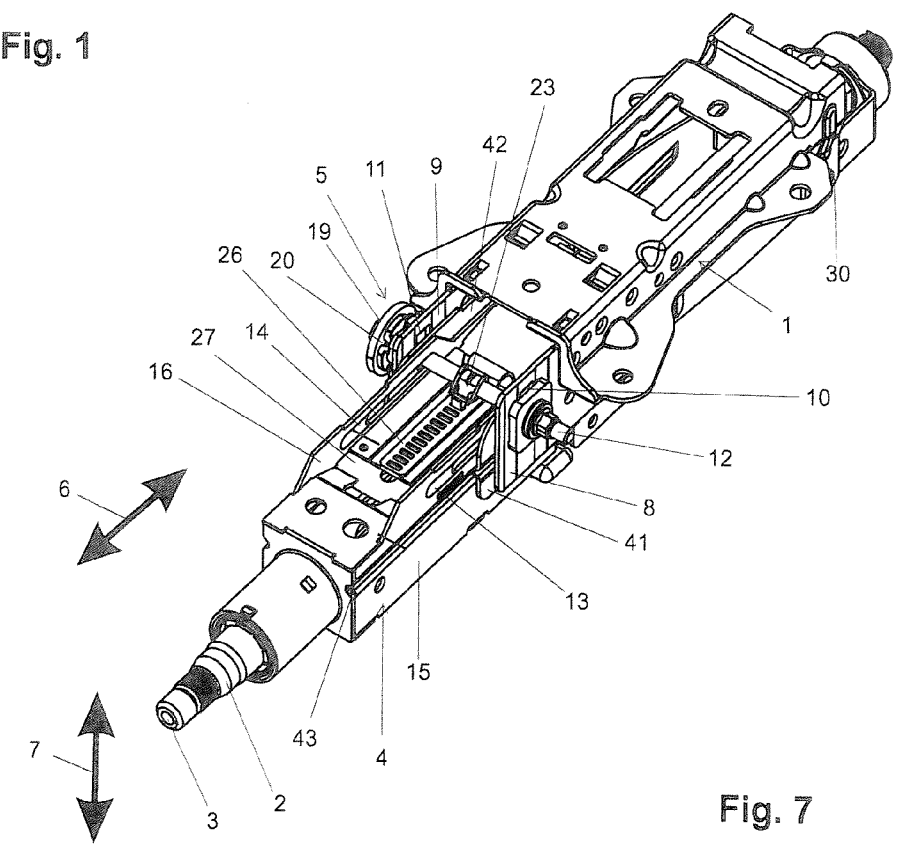
FIG. 7 is an oblique view of a steering column according to a second embodiment example of the invention.
Figure 3:
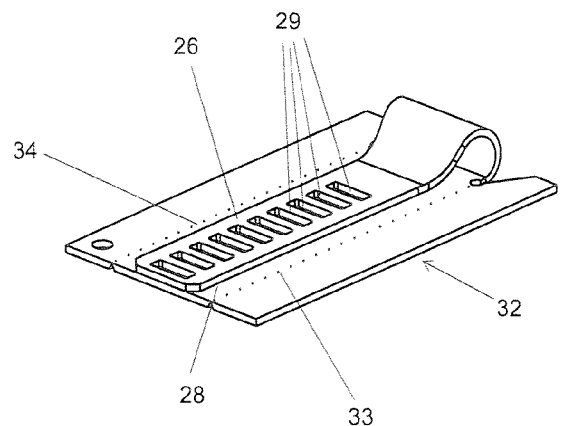
FIG. 3 is an oblique view of the counter-securement part.
Figure 2:
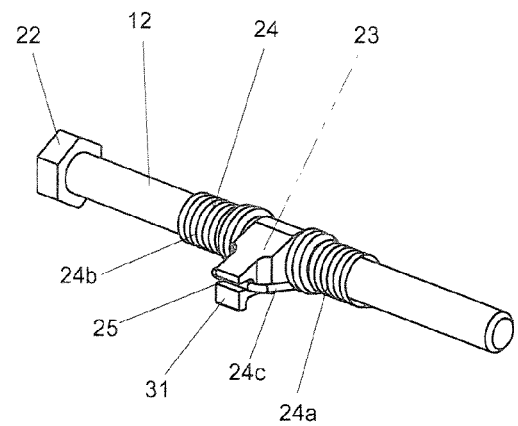
FIG. 2 is an oblique view of the clamp bolt with a securement part disposed thereon.
Figure 4:
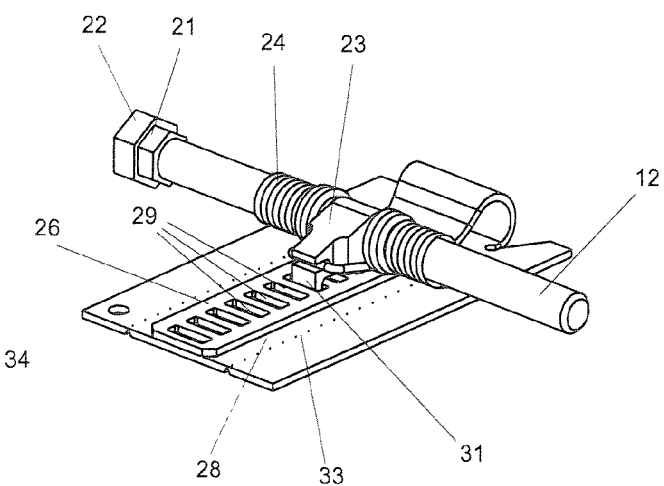
FIG. 4 shows the securement part disposed on a clamp bolt in engagement with the counter-securement part.
Figure 5:
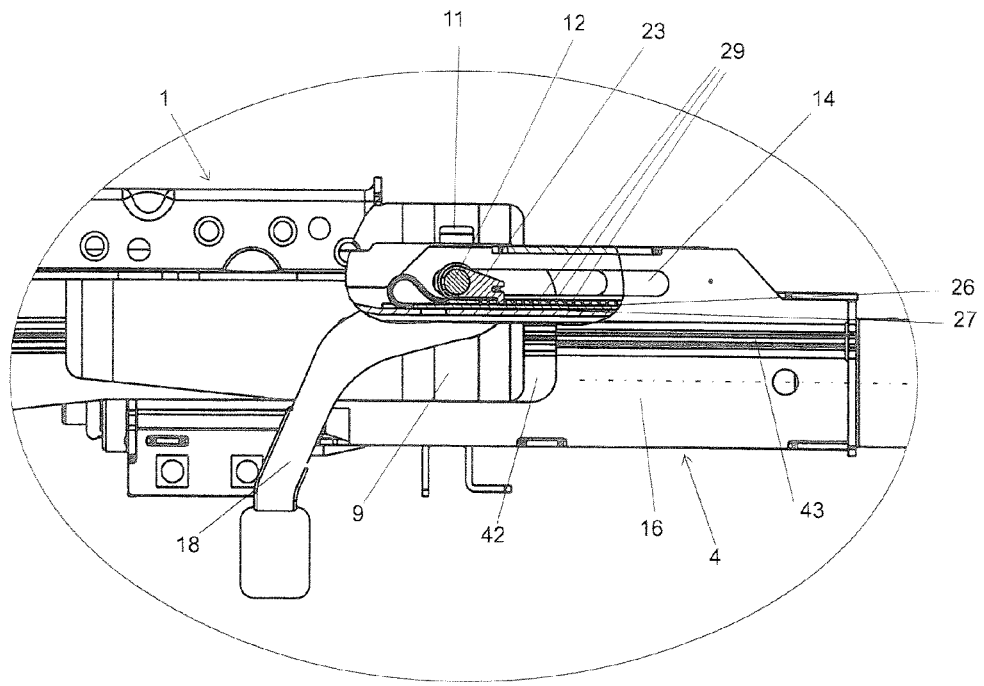
FIG. 5 shows a portion of the steering column in side view, partially cut, in the closed position of the actuation lever.

A first embodiment of a steering column according to the invention is depicted in FIG. 1 to FIG. 6, with FIGS. 2 and 4 illustrating variants of the clamp bolt 12 to this embodiment.

The steering column comprises a support unit 1 securable on the chassis of a motor vehicle. A steering spindle 2, on whose steering wheel-side end 3 a steering wheel is attachable, is pivotably bearing-supported by a jacket unit or setting unit 4, which is supported by the support unit 1. In the opened state of a clamping mechanism 5 the steering column is adjustable in its longitudinal direction 6 (=axial direction of the steering spindle 2) and in the direction 7 of the height or inclination. The setting unit 4 is herein displaceable with respect to the support unit 1 in the longitudinal direction 6 and in the direction 7 of the height or inclination adjustment.

The setting unit 4 is disposed between side jaws 8, 9 of the support unit 1 in openings 10, 11, which are realized in the form of elongated holes extending in the direction 7 of the height or inclination adjustment and through which penetrates a clamp bolt 12 of the clamping mechanism 5. The clamp bolt 12 penetrates further openings 13, 14 in side jaws 15, 16 of the setting unit (4), which extend in the form of elongated holes in the longitudinal direction 6.

The clamp bolt 12 is held by the margins of the openings 10, 11 penetrated by it in the side jaws 8, 9 of the support unit 1 nonshiftable in the particular set height or inclination position of the steering column in the longitudinal direction of the steering column.

Between the support unit 1 and the setting unit 4 in the depicted embodiment is disposed an intermediate unit. This includes side jaws 41, 42 which are disposed between the particular side jaw 8, 9 of the support unit 1 and the setting unit 4. The clamp bolt 12 penetrates round holes in the side jaws 41, 42. The intermediate unit is swivellable with respect to the support unit 1 about a swivel axis 30 in the direction 7 of the height or inclination adjustment. In the longitudinal direction 6 of the steering column, the side jaws 41, 42 are guided with respect to the setting unit 4 through projecting webs which engage into longitudinal grooves 43 on the side faces of the setting unit 4.

In the closed state of the clamping mechanism, the side jaws 8, 9 of the support unit 1 are clamped on both sides against the side jaws 41, 42 of the intermediate unit and this is clamped against the setting unit 4, wherein the cooperating friction faces represent arrest elements of the clamping mechanism acting under frictional closure. Press-on parts 17 disposed on the clamp bolts and pressed against the outside of the side jaws 8, 9 form further friction faces cooperating with the side jaws 8, 9, whereby further arrest elements of the clamping device acting under frictional closure are formed. It is conceivable and feasible in principle to provide further friction faces through cooperating lamella, as is known.

To open and close the clamping mechanism serves an actuation lever 18 through the swivelling of which in a known manner a cam disk 20 cooperating with a counter disk 19 (=wedge disk) is turned, wherein during the closing of the clamping mechanism the two disks 19, 20 are spread apart.

The arrest elements of the clamping mechanism 5 are thus brought into engagement with one another through an axial shifting of the clamp bolt 12 or through an axial shifting with respect to the clamp bolt 12.

Instead of an actuation lever 18, another actuation, for example electric actuation, of the clamping mechanism could also be provided. Instead of a wedge or cam disk 20, another mechanism for the axial shifting of the clamp bolt 12 or for the axial shifting of arrest elements with respect to the clamp bolt 12 could also be provided.

The actuation lever 18 is connected torsion-tight with the clamp bolt 12 by means of a surface projection 21 formed as a polygonal of the clamping bolt 12, as is illustrated in FIG. 4. The actuation lever 18 for the torsion-tight connection with the clamp bolt 12 could, instead, also mate over the bolt head 22 of the clamp bolt 12. It could be welded together with the clamp bolt 12 or be connected via a roller-burnishing or a knurling on the clamp bolt 12 through a press fit. A corresponding clamp bolt 12 without additionally realized surface projection 21 is illustrated in FIG. 2.

Through the torsion-tight connection of the actuation lever 18 with the clamp bolt 12, it is rotated about its axis during the opening and closing of the clamping mechanism.

On the clamp bolt 12 is disposed a securement part 23. It is located in the region between the side jaws 8, 9 of the support unit 1. The securement part 23 is advantageously disposed on the clamp bolt 12 swivellably with respect to the clamp bolt 12 about the latter's axis thereby that, as depicted, the clamp bolt 12 penetrates through an opening in the securement part 23.

On the clamp bolt 12 is further disposed a spring element 24. Bilaterally to the securement part 23, this comprises sections 24a, 24b encompassing the clamp bolt 12 in the manner of a coil spring, and a bow section 24c connecting these, wherein the sections 24a, 24b, 24c are comprised of a continuous spring wire. Sections 24a, 24b are nonrotatably connected with the clamp bolt 12, for example grip-fittingly, through form closure or through material closure, for example adhesion or spot welding. The bow section 24c extends through a channel 25 in the securement part 23.

Without external force being exerted, the securement part 23 is thereby held in a certain angular position with respect to the clamp bolt 12 and can be deflected out of it against the reset force of the spring element 24.

On the setting unit 4 is further held a counter-securement part 26 specifically on the upper side wall 27 of the setting unit 4, which wall is parallel to the axis of the clamp bolt 12. The counter-securement part 26 includes a plate with a multiplicity of engagement elements 29 successively spaced apart at a particular distance in the longitudinal direction 6 of the steering column or steering spindle 2. These engagement elements 29 are provided for the engagement under form closure of the securement part 23. In the depicted embodiment example these engagement elements 29 are formed by slot-form cutouts through the material of the plate, into which a projecting nose 31 of the securement part 23 can be inserted. The cutouts could also be realized for example in the form of groove-like indentations or simply as punched holes.

Figure 6:
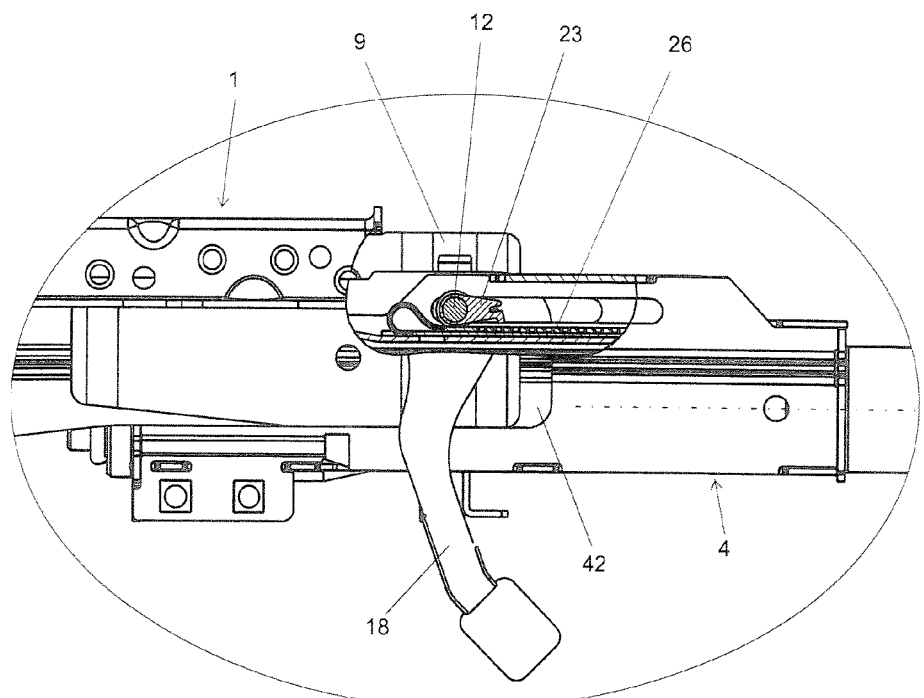
FIG. 6 is a view corresponding to FIG. 5, however in the open position of the actuation lever.
Figure 9:
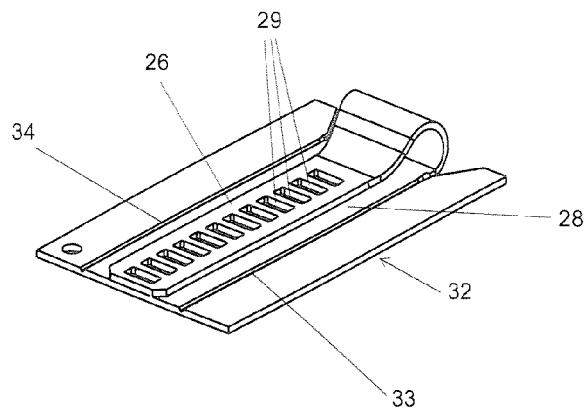
FIG. 9 is an oblique view of the counter-securement part.
Figure 8A:
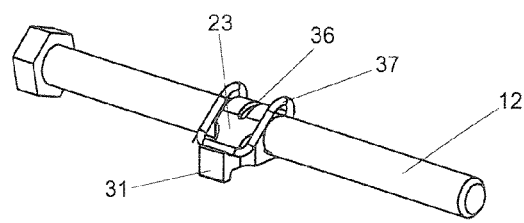
FIGS. 8a and 8b are oblique views of the clamp bolt with the securement part according to this second embodiment of the invention.
Figure 8B:
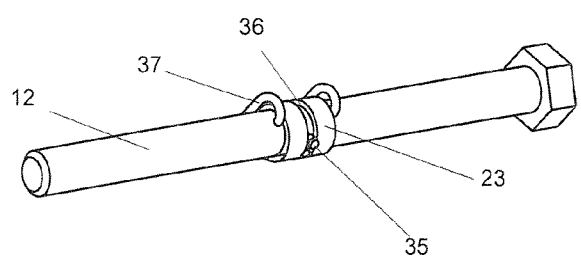
Figure 10:
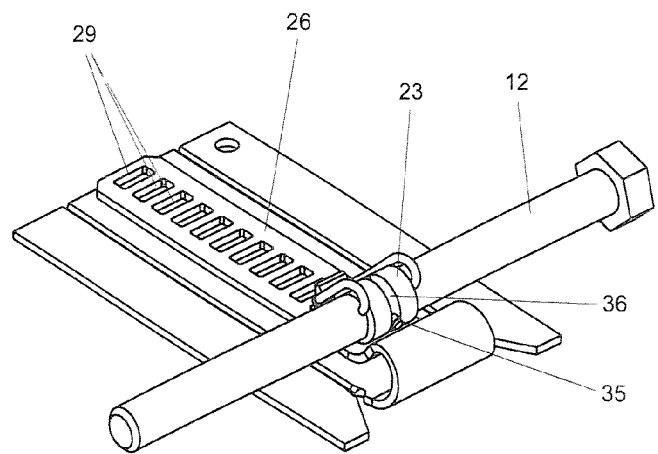
FIG. 10 shows the securement part disposed on the clamp bolt in engagement with the counter-securement part.
Figure 11:
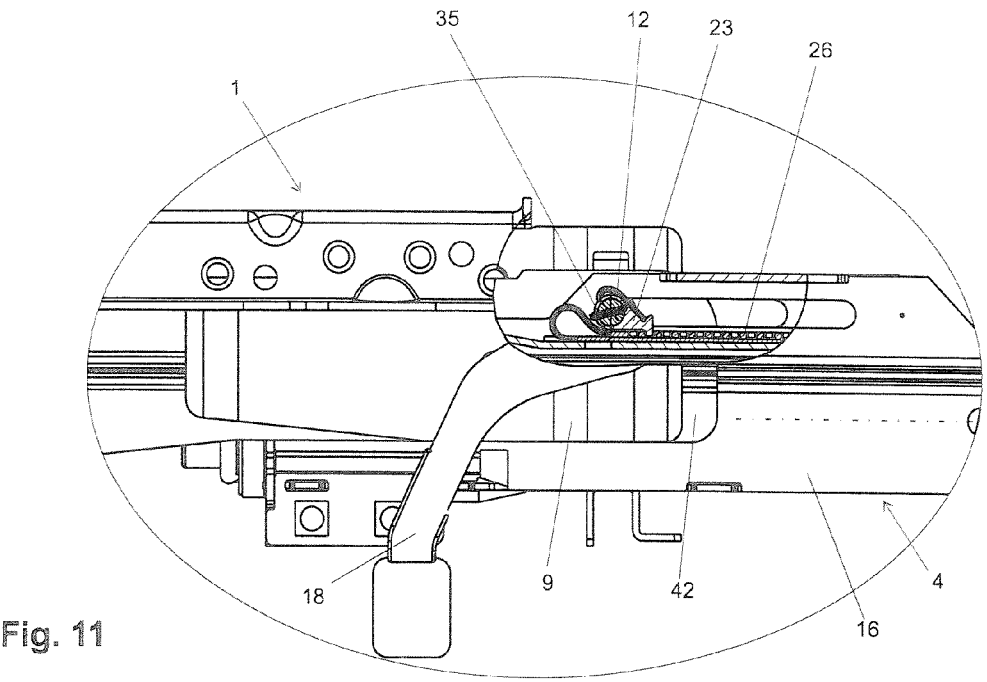
FIGS. 11 and 12 are side views of portions of the steering column according to the second embodiment, partially cut, in the closed and open position of the actuation lever.
Figure 12:
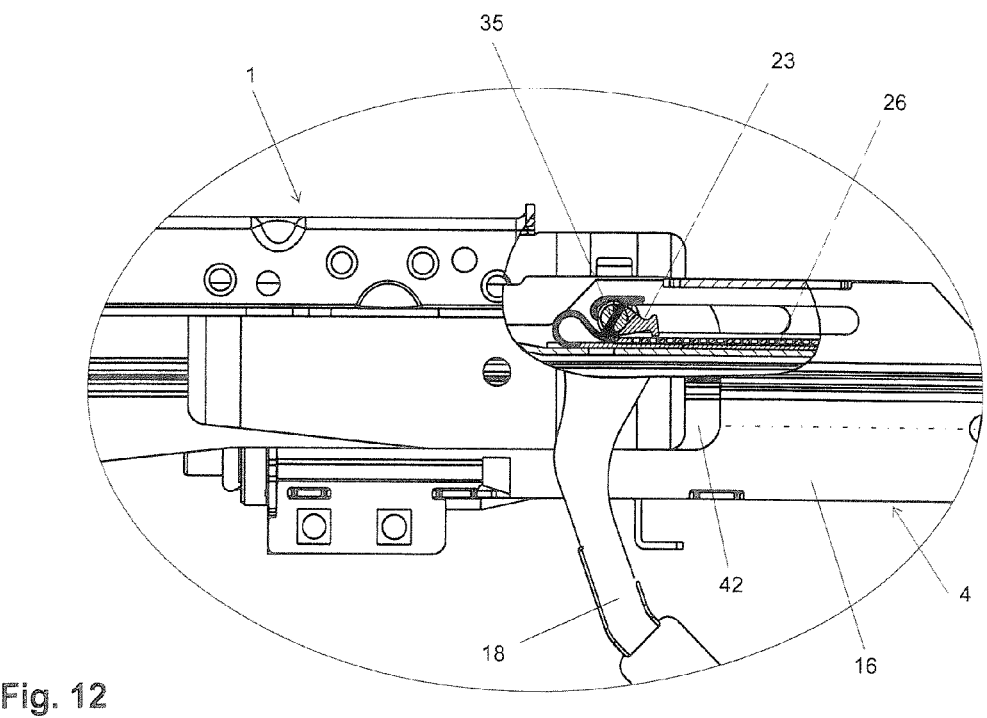

In the opened state of the clamping mechanism 5, the securement part 23 is raised off the counter-securement part 26, cf. FIG. 6. Through the turning of the clamp bolt 12 during the closing of the clamping mechanism 5, the securement part 23 is pressed onto the counter-securement part 26. Two cases can occur herein. On the one hand, the mutual position between securement part 23 and counter-securement part 26 (due to the instantaneous set position of the steering column in the longitudinal direction) can currently be such that the securement part 23 engages into one of the engagement elements 29 such that a form-closure engagement between the securement part 23 and the counter-securement part 26 is realized immediately. On the other hand, the nose 31 can come to rest on a web between two successive engagement elements 29. In this case the securement part 23 is pressed through the spring force of the spring element 24 against the counter-securement part 26. Should in the last-described position of the securement part 23 a vehicle crash occur through which the holding force, effected by the arrest elements of the clamping mechanism 5, of the setting unit 4 is exceeded with respect to the support unit 1, a shifting of the setting unit 4 with respect to the support unit 1 would begin until the nose 31 arrives in the region above an engagement element 29, whereupon it is brought into engagement with the engagement 29 through the spring force of the spring element 24.

Either immediately after the closing of the clamping mechanism 5 or at least after an initially minimal shifting of the setting unit 4 with respect to the support unit 1, which is smaller than the interspace of two successive engagement elements 29, in the event of a crash a form-closure engagement of the securement part 23 with the counter-securement part 26 occurs.

In the embodiment example according to FIGS. 1 to 6, the counter-securement part 26, realized in the form of a plate, is connected with the setting unit 4 in such manner that with the consumption of energy is shiftable with respect to the setting unit 4 in the longitudinal direction 6 of the steering column or of the steering spindle 2. For this purpose, one shank of the U-shaped counter-securement part 26 is connected via a recurvation with a tear plate 32, which, in turn, is rigidly connected with the side wall 27 of the setting unit 4. The tear plate 32 could also form a section of the side wall 27 of the setting unit 4.

The tear plate 32 comprises weakening lines 33, 34, formed for example by punch-ins, which are indicated in FIGS. 3 and 4 by dashed lines. Thereby a tear plate 28 is delimited. Through a sufficiently strong pull on the plate-shaped counter-securement part 26 the tear plate 28 can be progressively torn off along the weakening lines 33, 34 with the dissipation of energy, wherein a plate is formed which continues the plate-like counter-securement part 26. A further fraction of energy dissipation occurs through the bending work performed in the shifting of the site of the recurvation.

Figure 18:
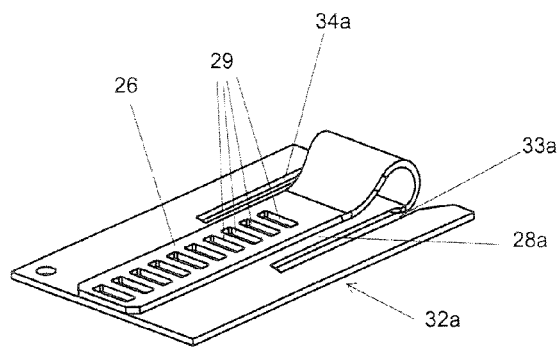
FIG. 18 is an oblique view of a counter-securement part according to a modified embodiment.

Instead of forming weakening lines 33, 34, the plate 28a can at least be partially realized as a flexural plate, which is separated from the base plate 32a by slots or elongated holes 33a, 34a in a predetermined bending region (cf. FIG. 18).

Figure 19:
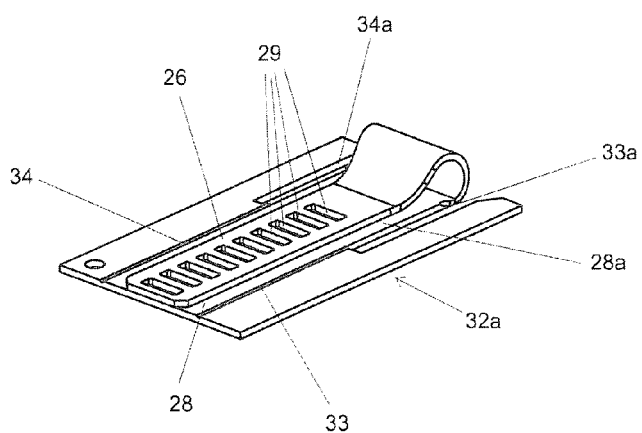
FIG. 19 is an oblique view of a counter-securement part according to a further, modified embodiment.

It is moreover conceivable and feasible to combine the two energy absorption mechanisms and to provide, adjoining the elongated holes 33a, 34a, corresponding weakening lines 33, 34, which make possible the controlled tearing open of the tear plate 28 after terminating the pure bending operation of the plate 28a (FIG. 19).

Figure 20:
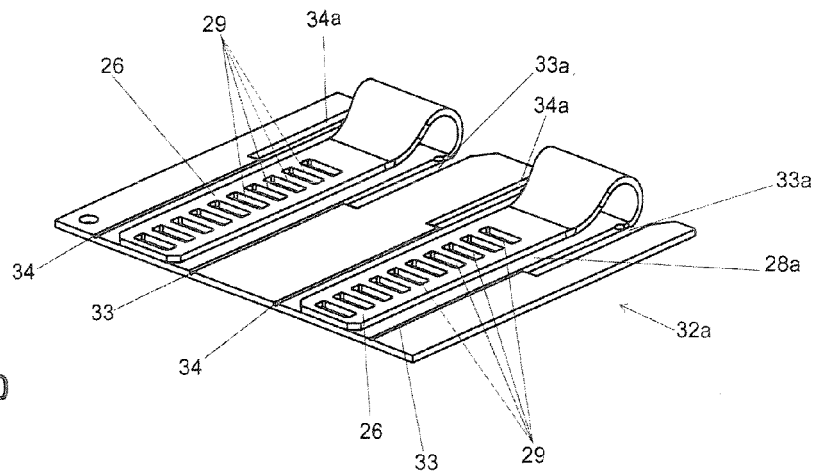
FIG. 20 is an oblique view of a counter-securement part according to a further, modified embodiment.

As illustrated in FIG. 20, such energy absorption elements can also be disposed parallel on a base plate, wherein at each energy absorption element pure bending formings or bending formings with adjoining material removal/tearing operations or pure tearing operations can be provided and with the discrete energy absorption elements identical or different energy absorption mechanism can be employed. It is herein feasible to provide two energy absorption elements or several energy absorption elements parallel on a single tear plate 32 or base plate 32a or on separate tear or base plates disposed one next to the other.

A second embodiment example of the invention is depicted in FIGS. 7 to 12. The difference from the previously described embodiment example comprises primarily the type of connection of the securement part 23 with the clamp bolt 12. The securement part 23 is again disposed swivellably on the clamp bolt 12. The clamp bolt is provided with a pin 35 radially projecting outwardly, which engages into a slot 36 in the securement part 23 and, during a swivelling of the securement part 23 with respect to the clamp bolt 12, becomes shifted therein. Further is disposed on the clamp bolt 12 a spring element 37 in the form of a bow spring, wherein ends of the spring wire project into radial bores of the clamp bolt 12. In the closed state of the clamping mechanism 5 the spring element 37 extending over the securement part 23 presses the securement part 23 against the counter-securement part 26 (cf. FIGS. 10 and 11). When the clamp bolt 12 is rotated during the opening of the clamping mechanism 5 (in the clockwise direction viewed from the end opposite the bolt head 22) the pin 35 is jointly swivelled and abuts an end of slot 36 (this is located in FIG. 8b minimally beneath pin 35), whereupon the securement part 23 is swivelled and raised from the counter-securement part 26.

Figure 13:
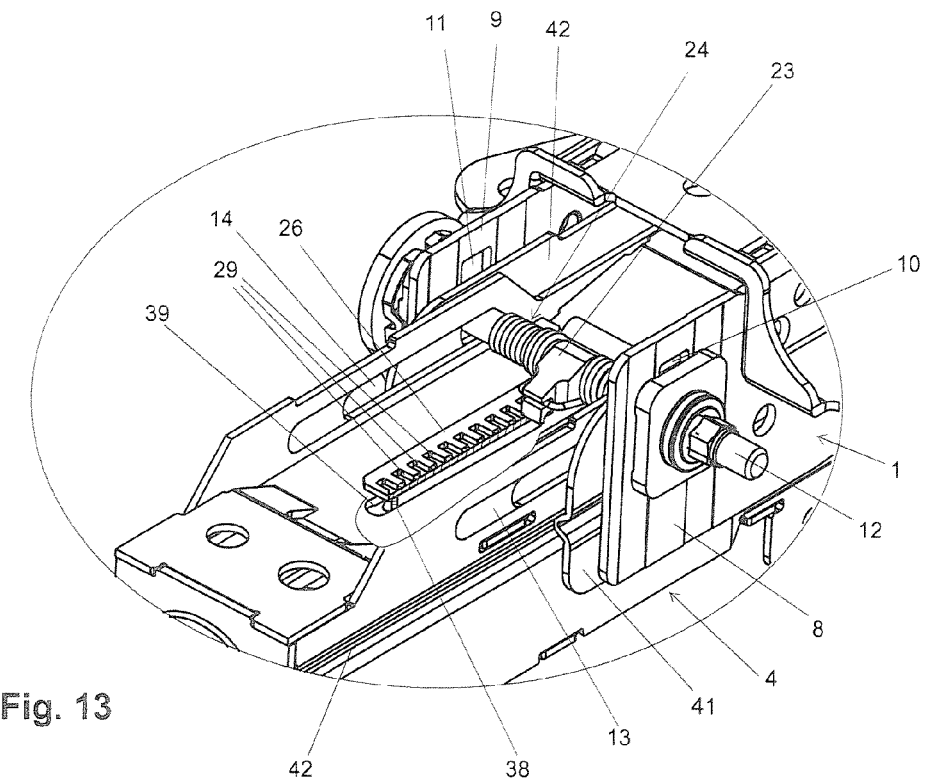
FIG. 13 shows a portion of an oblique view of a steering column according to a third embodiment, a portion of the setting unit being omitted for the sake of clarity, and the counter-securement part cut in the longitudinal center.

Other connections of the counter-securement part 26 with the setting unit 4 are also conceivable and feasible, through which the counter-securement part 26 is shiftable in the event of a motor vehicle crash with the consumption of energy with respect to the setting unit 4. FIG. 13 shows by example an embodiment in which on the side of the counter-securement part 26 facing away from the securement part 23 a bolt 38 is disposed which extends into an elongated hole 39, extending in the longitudinal direction 6, in the side wall 27 of the setting unit 4. In the starting state the bolt 38 is in an enlarged region of the elongated hole 39. With a shifting of bolt 38 with respect to the elongated hole 39 a widening of the elongated hole 39 occurs, whereby energy is consumed.

Figure 21:
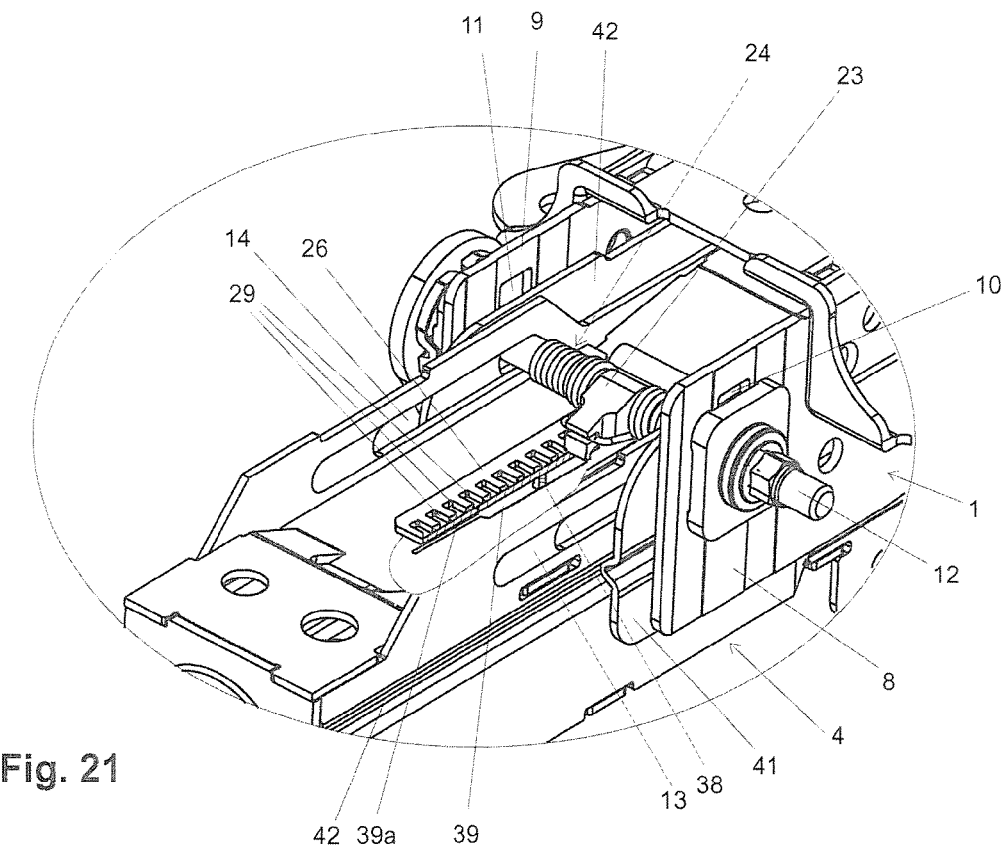
FIG. 21 shows a portion of an oblique view of a steering column according to a variant of the third embodiment, a portion of the setting unit being omitted for the sake of clarity, and the counter-securement part cut in the longitudinal center.

In a variant of this embodiment, which is illustrated in FIG. 21, the elongated hole 39 is adjoined by a strip region 39a, which is separated when the bolt 38 is run in. In this manner in a first section a first energy absorption level by means of the widening of the elongated hole 39 can be specifically set and, in a second section, a second energy absorption level by means of the separation of the strip region 39a. It is also possible to vary the width of the elongated hole over the shifting path of the bolt according to the desired course of the energy absorption. The width can thus, for example, be decreased continuously toward the end of the crash path in order to attain a progressive energy absorption.

The strip region 39a can alternatively also be represented as an elongated hole with very narrow width, for example less than half of the diameter, or the thickness, of bolt 38.

It is also conceivable and feasible to omit the widening of an elongated hole 39 entirely and to represent the energy absorption exclusively through the separation of a strip region 39a. On the top and/or underside of the strip region 39a a longitudinal groove is advantageously disposed. The groove is dimensioned appropriately in terms of depth and/or width for the setting of the energy absorption level.

Figure 14:
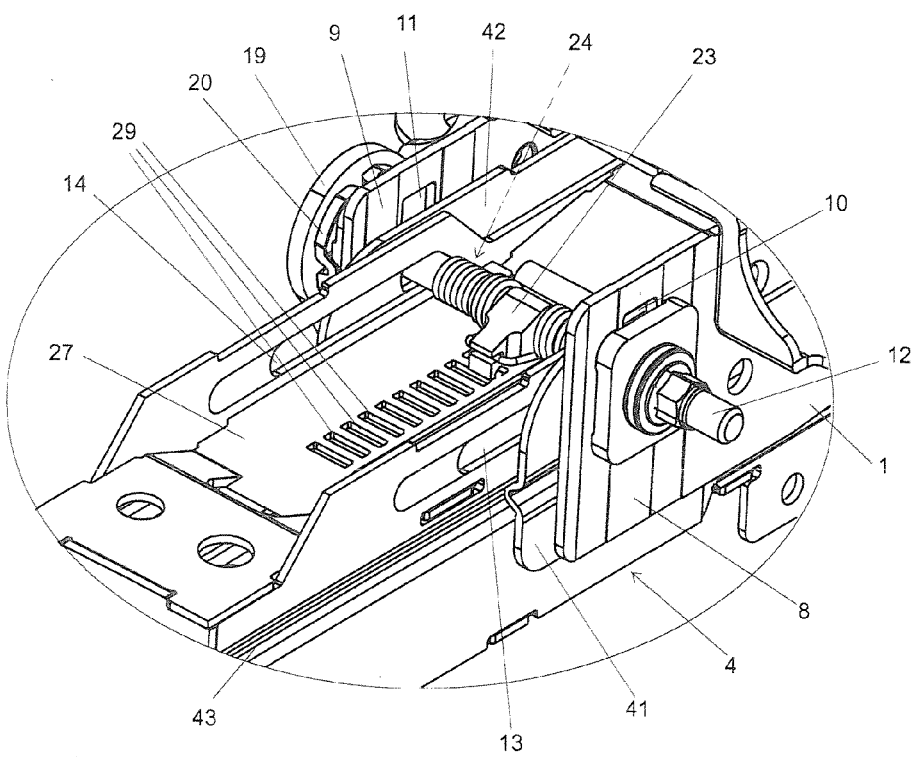
FIG. 14 shows a portion of an oblique view of a steering column according to a fourth embodiment.

If no energy-dissipating shifting of the setting unit 4 with respect to the support unit 1 in the event of a crash is desired, but rather an additional holding force is to be attained, the counter-securement part 26 can be connected rigidly with the side wall 27 of the setting unit 4 or be directly formed by it. An embodiment of a latter realization is depicted in FIG. 14. The engagement elements 29 are here disposed directly in the side wall 27.

Figure 15:
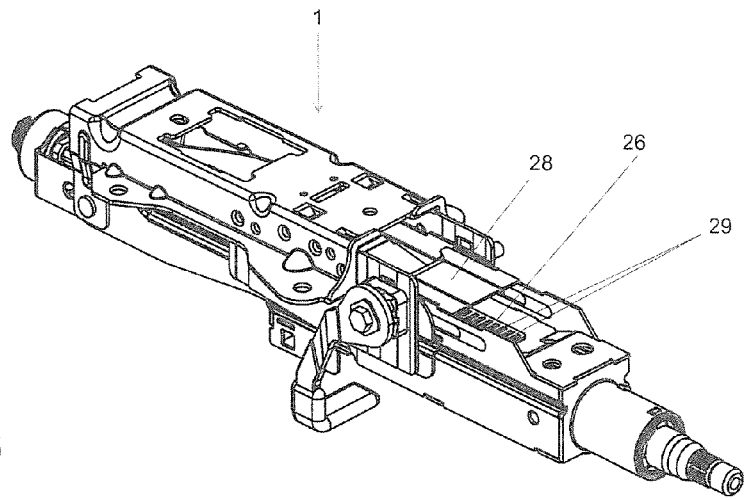
FIG. 15 is an oblique view of a steering column according to a fifth embodiment.
Figure 16:
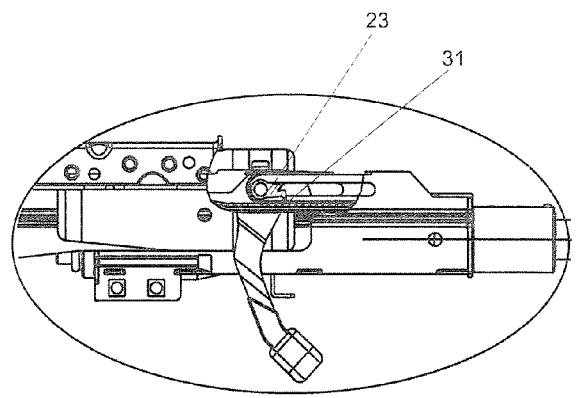
FIG. 16 shows a portion of a side view of the steering column according to this fifth embodiment, partially cut.
Figure 17:
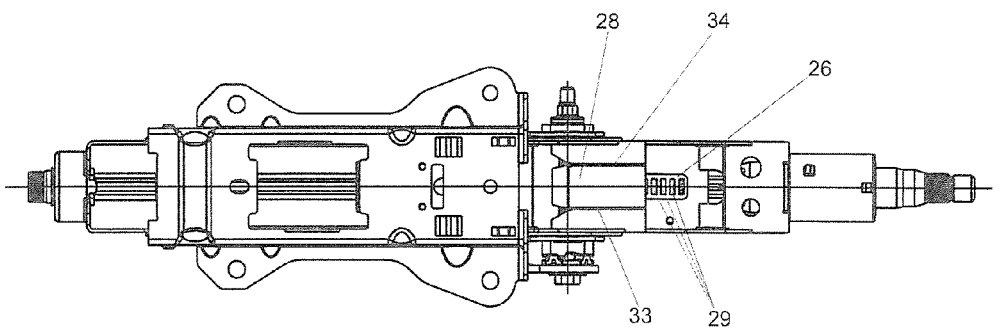
FIG. 17 is a top view onto the steering column according to the fifth embodiment.

In the embodiment example depicted in FIGS. 15 to 17, the U-shaped counter-securement part 26 encompasses the securement part 23. The section including the engagement elements 29 is located in contact on the upper side wall of the setting unit 4. The tear plate with the tear plate 28 is secured on the setting unit 4 on the side of the clamp bolt 12 facing away from the steering spindle.

Instead of a tear plate 28, again, a flexural plate or a combination of a flexural and tear plate, for example, could be provided.

In the several, previously described embodiments, each of the counter-securement parts 26 is disposed on the upper side wall 27 of the setting unit 4 or is formed by it. Instead, the counter-securement part could also be disposed on another wall of the setting unit 4 disposed parallel to the axis of the clamp bolt 12 or be formed by it, for example by the lower side wall.

The engagement elements 29 of the counter-securement part 26 could also be realized in the form of cutouts, wherein the securement part has an adapted engagement element in order to make possible the nonshiftable engagement, especially the form-closure engagement, with respect to the longitudinal direction 6 of the steering column or steering spindle 2, between the securement part 23 and counter-securement part 26. Herein would again be provided a multiplicity of engagement positions for the securement part 23 in the longitudinal extension, extending in the longitudinal direction 6, of the counter-securement part 26. The engagement elements 29, for example, of the counter-securement part 26, could also be formed by teeth of a toothing, and the securement part 23 could be realized with a corresponding counter-toothing.

The intermediate unit 40, provided in the depicted embodiments between the support unit 1 and the setting unit 4, could also be omitted. The side jaws 8, 9 of support unit 1 could in this case be pressed on both sides directly against the setting unit 4 when the clamping mechanism 5 is in its closed state. The swivel axis between the setting unit 4 and the support unit 1 could in this case also be formed, for example, by a universal joint via which the steering spindle 2 is connected with a further section of the steering spindle. This swivel axis could, furthermore, also be formed by a swivel bolt disposed on the support unit 1, which penetrates an elongated hole, extending in the longitudinal direction 6, of the setting unit 4.

The invention can also be employed in steering columns which are only adjustable in the longitudinal direction 6. The clamp bolt 12 could in this case penetrate through openings 10, 11, realized in the form of round holes, in the side jaws 8, 9 of the support unit 1.

The sections of the side jaws 15, 16, projecting beyond the upper side wall 27, of the setting unit 4 could also be omitted such that the clamp bolt 12 does not penetrate openings 13, 14 in the setting unit 4.

It would also be conceivable and feasible to connect the securement part 23 nonswivellably with the clamp bolt 12 and which itself is, for example, spring-elastically realized. Moreover, an embodiment could, for example, be provided in which a securement part 23 is nonswivellably connected with the clamp bolt 12 and during the opening and closing of the clamping mechanism 5 a driving element, for example the actuation lever 18, acts directly onto a clamp part, for example the wedge or cam disk 20, and turns it. The clamp bolt 12 could be entrained by the clamp part through its rotation and specifically with the interconnection of a spring element such that the securement part 23 in the closed state of the clamping mechanism 5 is pressed by this spring element onto the counter-securement part 26.

It would further also be conceivable and feasible to provide the engagement elements on an elongated part of the securement part and to provide on the counter-securement party a nose which engages into the engagement elements.

In all of the described embodiments in which an energy-dissipating shiftability of the counter-securement part with respect to the setting unit is provided, the shiftability of the counter-securement part with respect to the setting unit has a defined predetermined or settable force-path course. With a force acting in the axial direction of the steering column, which is of such magnitude that a shifting of the counter-securement part with respect to the setting unit occurs, the setting unit becomes herein advantageously shifted in the axial direction of the steering column.

The magnitude of the force acting onto the setting unit in the longitudinal direction of the steering column in the direction toward the motor vehicle front, starting at which a shifting of the counter-securement part with respect to the setting unit occurs, is preferably less than 10,000 N. It can for example also be less than 5000 N.

LEGEND TO THE REFERENCE NUMBERS

1 Support unit
2 Steering spindle
3 Steering wheel-side end
4 Setting unit
5 Clamping mechanism
6 Longitudinal direction
7 Direction
8 Side jaw
9 Side jaw
10 Opening
11 Opening
12 Clamp bolt
13 Opening
14 Opening
15 Side jaw
16 Side jaw
17 Press-on part
18 Actuation lever
19 Counter disk
20 Cam disk
21 Surface projection
22 Bolt head
23 Securement part
24 Spring element
24*a* Section
24*b* Section
24*c* Bow section
25 Groove
26 Counter-securement part
27 Side wall
28,28*a* Plate
29 Engagement element
30 Swivel axis
31 Nose
32 Tear plate
32*a* Base plate
33 Weakening line
33*a* Elongated hole
33*b* Elongated hole
34 Weakening line
35 Pin
36 Slot
37 Spring element
38 Bolt
39 Elongated hole
39*a* Strip region
40 Intermediate unit
41 Side jaw
42 Side jaw
43 Longitudinal groove

What is claimed is:

1. A steering column for a motor vehicle, which is adjustable at least in a longitudinal direction thereof, the steering column comprising:
    a support unit connectable with a chassis of the motor vehicle, the support unit having side jaws;
    a securement part disposed between the side jaws of the support unit;
    a setting unit disposed between the side jaws of the support unit;
    a counter-securement part connected with the setting unit; and
    a clamping mechanism which has an opened state and a closed state and which includes a clamp bolt which penetrates openings in the side jaws of the support unit, the clamp bolt having an axis and rotating about the axis during opening and closing of the clamping mechanism,
    wherein the clamping mechanism is operably engaged with the setting unit such that, in the opened state of the clamping mechanism, the setting unit is displaceable with respect to the support unit at least in the longitudinal direction of the steering column, and, in the closed state of the clamping mechanism, the setting unit is secured at a set position with respect to the support unit,
    wherein the securement part is displaced through the rotation of the clamp bolt during the opening and closing of the clamping mechanism,
    wherein the securement part engages into the counter-securement part in the closed state of the clamping mechanism or comes into engagement with the counter-securement part during dislocation of the setting unit with respect to the support unit in an event of a motor vehicle crash, wherein the securement part is spaced apart from the counter-securement part in the opened state of the clamping mechanism, wherein the counter-securement part is disposed on or formed by a wall which is parallel to the axis of the clamp bolt, wherein the counter-securement part is connected with the setting unit via a tear plate or a flexural plate or a combination of a flexural and tear plate, wherein, in the event of the motor vehicle crash, the counter-securement part is shiftable with respect to the setting unit with a consumption of energy by tearing the tear plate or by flexing the flexural plate or by tearing and flexing the combination of the flexural and tear plate, wherein the tear plate or the flexural plate or the combination of the flexural and tear plate is a U-shaped element with two shanks wherein one of the shanks comprises several engagement elements for engaging the securement part into the counter-securement part, and wherein the engagement elements are one succeeding another in the longitudinal direction of the steering column.

2. The steering column of claim 1, wherein the wall which is parallel to the axis of the clamp bolt is a lower or an upper side wall of the setting unit.

3. The steering column of claim 1, wherein the engagement elements are formed by cutouts into each of which a projecting nose of the securement part can be inserted to secure the setting unit with respect to the support unit in the longitudinal direction of the steering column.

4. The steering column of claim 1, wherein, in the closed state of the clamping mechanism, the securement part is spring-elastically pressed onto the counter-securement part.

5. The steering column of claim 4, wherein the securement part is swivellable with respect to the clamp bolt, and a spring element acts between the clamp bolt and the securement part.

6. The steering column of claim 1, wherein the counter-securement part is connected with the setting unit via at least one bolt which engages into an elongated hole, and wherein a hole width of the elongated hole is at least partially narrower than an outer diameter of the bolt, whereby in the event of the motor vehicle crash the bolt is shiftable in the elongated hole with the consumption of energy.

7. The steering column of claim 1, wherein, in the closed state of the clamping mechanism, the side jaws of the support unit are pressed bilaterally onto the setting unit.

8. The steering column of claim 1, further comprising an intermediate unit which has side jaws and which is disposed between the setting unit and the side jaws of the support unit, and wherein, in the closed state of the clamping mechanism, the side jaws of the support unit are pressed bilaterally onto the side jaws of the intermediate unit, which in turn are pressed bilaterally onto the setting unit.

9. The steering column of claim 1, wherein the clamp bolt is held nonshiftably in the longitudinal direction of the steering column through margins of the openings in the side jaws of the support unit.

10. The steering column of claim 1, wherein shifting of the counter-securement part with respect to the setting unit begins at a force, acting in the longitudinal direction of the steering column onto the setting unit, which is less than 10,000 N.

11. The steering column of claim 1, wherein the other one of the shanks is connected with the setting unit.

12. The steering column of claim 1, wherein the U-shaped element comprises an arc section connecting the two shanks, wherein the two shanks project from the arc section in a direction to a steering wheel-side end of the steering column.

13. The steering column of claim 1, wherein the U-shaped element comprises an arc section connecting the two shanks, wherein the two shanks are closer together than an outer diameter of the arc section.

14. The steering column of claim 1, wherein the tear plate or the flexural plate or the combination of the flexural and tear plate is a sheet metal element.

15. The steering column of claim 1, wherein the securement part has exactly one single projecting nose for engagement with any one of the engagement elements to secure the setting unit with respect to the support unit in the longitudinal direction of the steering column.

* * * * *